Figure 1:
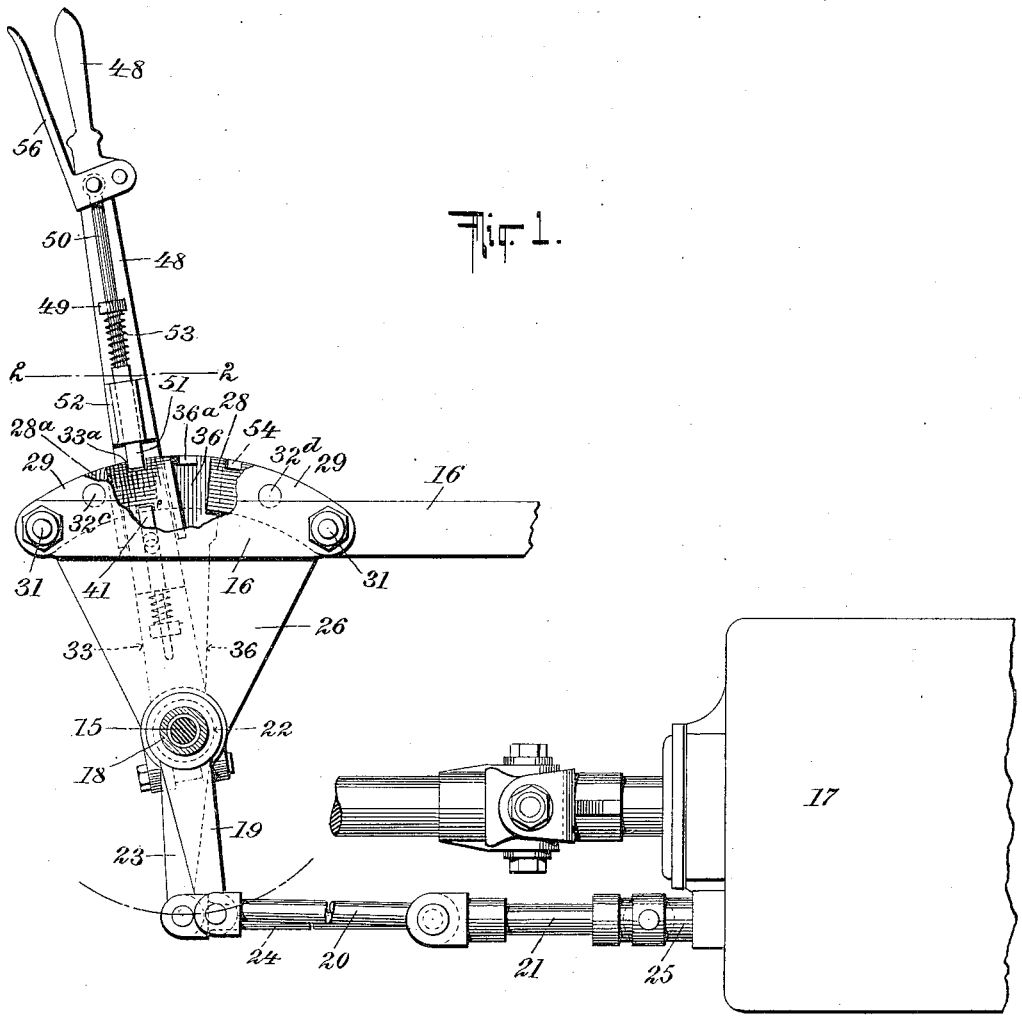

J. M. MACK.
TRANSMISSION LEVER.
APPLICATION FILED MAR. 7, 1910.

1,064,662.

Patented June 10, 1913.
3 SHEETS—SHEET 1.

WITNESSES:
Edwin H Dietrich
George Bambay

INVENTOR
JOHN M. MACK
BY
Conrad A Dietrich
his ATTORNEY

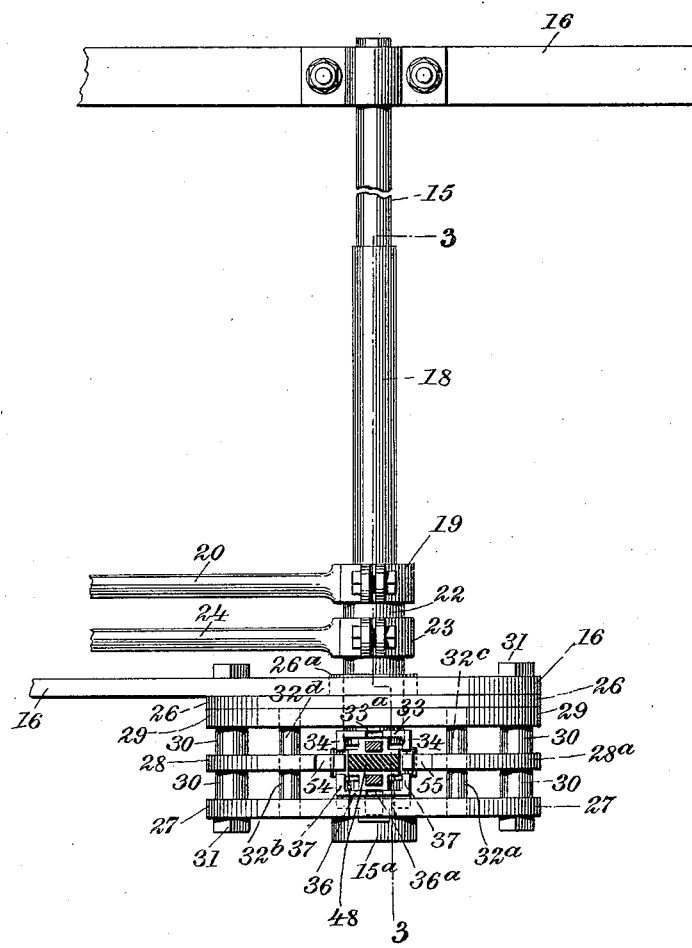

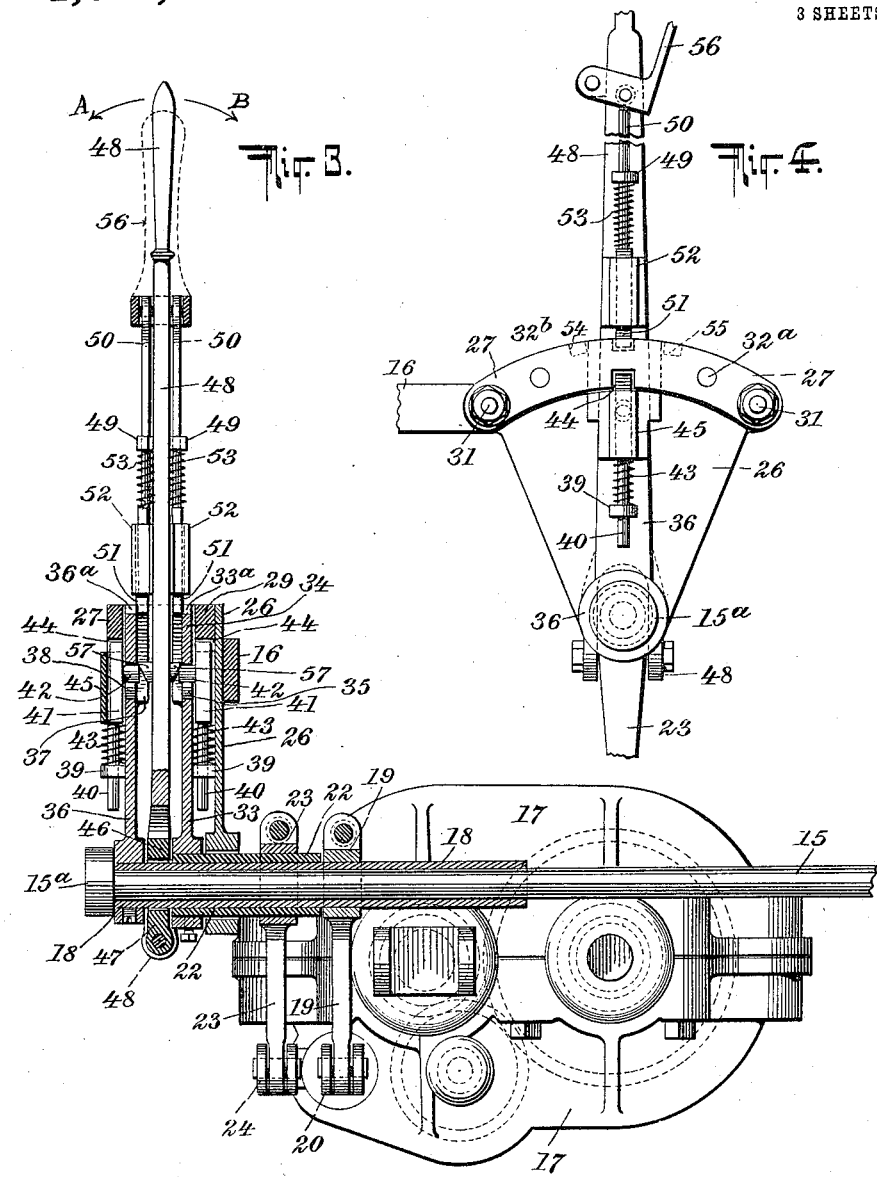

UNITED STATES PATENT OFFICE.

JOHN M. MACK, OF ALLENTOWN, PENNSYLVANIA, ASSIGNOR TO INTERNATIONAL MOTOR COMPANY, OF WILMINGTON, DELAWARE, A CORPORATION OF DELAWARE.

TRANSMISSION-LEVER.

1,064,662.  Specification of Letters Patent.  Patented June 10, 1913.

Original application filed April 28, 1906, Serial No. 314,226. Divided and this application filed March 7, 1910. Serial No. 547,733.

*To all whom it may concern:*

Be it known that I, JOHN M. MACK, a citizen of the United States, residing at Allentown, Lehigh county, in the State of Pennsylvania, have invented certain new and useful Improvements in Transmission-Levers, of which the following is a full, clear, and exact specification.

My invention relates to improvements in motor vehicles, and the same has for its object more particularly to provide a simple, efficient and reliable mechanism, in which by means of a single operating lever, a plurality of different speeds in a forward direction, and a single speed in a reverse direction may be obtained.

Further, said invention has for its object to provide an operating lever, by means of which the operator is enabled to select at will any of the three forward speeds, or the reverse speed.

Further, said invention has for its object to provide an operating lever, comprising a main lever and a plurality of supplemental levers adapted to be locked in operative engagement with said main lever, for bringing different portions of the transmission mechanism into operation.

To the attainment of the aforesaid objects and ends, my invention consists in the novel details of construction, and in the combination, connection and arrangement of parts hereinafter more fully described, and then pointed out in the claims.

In the accompanying drawing forming part of this specification wherein like numerals of reference indicate like parts, Figure 1 is a side view partly broken away, looking from the inner side, showing one form of transmission lever constructed according to and embodying my said invention; a portion of a transmission casing being also shown connected thereto; Fig. 2 is a top view, partly in section on the line 2—2 of Fig. 1; Fig. 3 is a section taken on the line 3—3 of Fig. 2, looking in the direction of the arrow, and Fig. 4 is a side view, showing the main or operating lever locked to its neutral position.

In said drawings, 15 denotes a shaft which is supported transversely upon the vehicle frame 16 in front of the forward end of the transmission casing 17, and provided at its outer end with a head 15ª. Upon said shaft 15 is disposed a hollow sleeve 18 having fixed thereon an arm 19 which is pivotally secured at its lower end to a link 20 which is pivotally connected at its other end to the projecting end of a shifting rod 21 arranged in the casing 17, and which shifting rod is adapted, for example, to control the high speed gear when said rod is moved inward, and the second speed gear when said rod is drawn outward. 22 denotes a second sleeve which is disposed upon the sleeve 18 adjacent to its outer end, and has fixed thereon an arm 23 arranged beside the arm 19. The lower end of said arm 23 is pivotally secured to a link 24 which in turn is suitably connected at its rear end to the projecting portion of a tubular shifting rod 25 inclosing the shifting rod 21. The shifting rod 25 is adapted to control, for example, the low speed gear when the said rod is moved inward, and the reverse gear when said rod is drawn outward.

Upon one side member of the frame 16 directly above the shaft 15 is bolted a segmental plate 26 having an aperture in its lower end forming a bearing 26ª for the sleeve 22, and the parts therein. At the upper edge of said plate 26 are provided guides 27, 28, 28ª and 29, which are secured to said plate 26 and maintained duly separated from each other by sleeve sections 30, 30, intermediate said guides 27, 28, 28ª and 29, upon bolts 31, 31, and adjacent to said bolts 31, 31, are provided transverse bolts or studs forming stops 32ª, 32ᵇ, 32ᶜ, 32ᵈ, which also serve to support and maintain the inner separated ends of the guide plates 28, 28ª, separated from each other at their inner ends. Upon the outer end of the sleeve 22 is fixed the lower end of the supplemental lever 33 arranged in line with the arm 23 on said sleeve. The upper end of said supplemental lever 33 is provided along its vertical edges with inwardly projecting portions 34, 34, and intermediate said inwardly projecting portions said lever is provided with a longitudinal slot 35. Upon the outer end of the sleeve 18 is fixed the lower end of a second supplemental lever 36, corresponding to the lever 33, and arranged in line with the arm 19 on said sleeve 18. The upper end of said supplemental lever 36 is also provided with inwardly projecting portions 37, 37, and intermediate said inwardly projecting portions, said lever is also provided with a longitudinal slot 38. Upon the outer surfaces of said supplemental levers 33, 36, are arranged bearings 39, 39, within which are disposed the stems 40, 40, of bolts 41, 41, provided upon the inner opposing surfaces with studs 42, 42, extending through the longitudinal slots 35, 38, in the levers 33, 36, respectively.

43, 43, denote springs disposed about the stems 40, 40, intermediate the bearings 39, 39, and the bolts 41, 41, whereby to hold the latter normally projected and the ends thereof within the recesses 44, 44 in the undersides of the guide plates 27, 29. The bolt 41 of the supplemental lever 33 is held in position by the plate 26, and the bolt 41 of the supplemental lever 36 is held in position by a guide 45 secured upon the outer surface of said lever 36.

46 denotes a collar loosely disposed upon the outer end of the sleeve 18 between the fixed ends of the supplemental levers 33, 36, which collar is provided with a depending bearing portion 47, and 48 denotes an operating lever having its lower end bifurcated and embracing said collar 46, and the ends of its bifurcated portion pivotally secured to the depending bearing portion 47 of said collar, whereby to permit of said operating lever 48 being rotated upon the sleeve 18, and also oscillated thereon in a direction parallel with the longitudinal axis of said sleeve 18, and the shaft 15 therein. The operating lever 48 is provided upon its opposite sides above the guide plates 27, 28, 28$^a$, 29, with bearings or guides 49, 49, within which work rods 50, 50, having bolts 51, 51 secured to their lower ends working in guides 52, 52, secured to said operating lever, and springs 53, 53, disposed upon said rods intermediate said bolts 51, 51, and bearings 49, 49.

When the operating lever 48 is rotated and shifted sidewise into engagement with one of the supplemental levers 33, 36, one of the bolts 51, 51, on the sides of the operating lever 48 will be caused to engage with one of the recesses 54, 55, provided in the upper edges of the separated guide plates 28, 28$^a$, respectively, and thereby hold the operating lever 48 and either of the supplemental levers 33, 36, which happens to be in engagement therewith jointly locked to their adjusted position. Upon the upper end of the operating lever 48 is pivotally secured the bifurcated end of a lever 56 to which are pivotally secured the upper ends of the rods 50, 50 of the bolts 51, 51, arranged upon the opposite sides of said operating lever.

Upon the portion of the operating lever 48 opposite to the recesses 35, 38, arranged in the supplemental levers 33, 36, are provided outwardly projecting studs 57, 57, having the undersides of their outer ends beveled downward and inward to form cams adapted to engage the studs 42, 42, to actuate the bolts 41, 41, when the operating lever 48 is oscillated in either direction to engage with one of said supplemental levers 33, 36. When the operating lever 48 is in its neutral position, that is to say, in position between the opposite ends of the intermediate guide plates 28, 28$^a$, the studs 57, 57, will engage the inner ends of the studs 42, 42, of the bolts 41, 41, without causing the upper ends of said bolts to be withdrawn from the recesses 44, 44, in the undersides of the guide plates 27, 29, and thus serve to hold the operating lever 48 locked to its neutral position.

The operation of the apparatus is as follows: When the operating lever 48 is in the neutral position, as indicated at Figs. 3 and 4, all the parts of the transmission mechanism contained within the casing 17 will be out of engagement. When the operating lever 48 is drawn outward in the direction of the arrow A, Fig. 3, it will engage the supplemental lever 36 intermediate the portions 37, 37, thereof, and at the same time the cam stud 57 will engage the stud 42 of the bolt 41 on the supplemental lever 36 and depress said bolt and release its upper end of its engagement with the recess 44 in the lower edge of the outer guide plate 27. As soon as the bolt 41 of the supplemental lever 36 has been released, the operating lever 48 and said supplemental lever 36 may be jointly moved forward or backward between the guide plates 27, 28, 28$^a$, and be jointly locked to their shifted position by the engagement of the bolt 51 on the inner side of the operating lever 48 with either of the recesses 54, 55, arranged in the upper edge of the intermediate guide plates 28, 28$^a$. By shifting the operating lever 48 and the supplemental lever 36 forward until the same engage the stop 32$^a$, the shifting rod 21 will be forced inward by the arm 19 and link 20 and cause, for example, the high speed of the transmission to be placed in operation. By shifting the operating lever 48 and its connected supplemental lever 36 backward and against the stop 32$^b$, the shifting rod 21 will be drawn outwardly and place the second speed of the transmission in operation. In order to bring the low speed and the reverse gears of the transmission into operation, the operating lever 48 and supplemental lever 36 must first be unlocked by means of the lever 56 and rods 50, 50, and said operating lever and supplemental lever returned to its neutral position between the separated ends of the intermediate guide plates 28, 28$^a$. The operating lever 48 may then be disengaged from the supplemental lever 36 and the latter locked to its normal position by the engagement of its bolt 41 with the recess in the underside of the outer guide plate 27. By throwing the operating lever inward (in the direction of the arrow B, Fig. 3) the same will be caused to engage the supplemental lever 33 and release the bolt 41 thereof by the contact of the inner cam stud 57 with the stud 42 of the bolt 41 arranged upon the supplemental lever 33, and thus permit of the operating lever 48 and the supplemental lever 33 to be jointly actuated. By shifting said operating lever 48 and the supplemental lever 33 forward and against the stop 32°, the sleeve 22 and arm 23 will be partially rotated and the tubular shifting rod 25 and link 24 moved inward without disturbing the shifting rod 21, and cause the low speed gear of the transmission to be placed in operation. By releasing the locking bolt 51 on the outer side of the operating lever 48 of its engagement with the recess 55 in the intermediate guide plate 28ª, the operating lever 48 may be shifted again, and when adjusted to contact with the stop 32ᵈ, the tubular shifting rod will be drawn outward by the link 24 and arm 23, and the reverse gear of the transmission brought into operation.

The supplemental lever 33 and the operating lever 48 are jointly locked to their forward position by the engagement of the left hand bolt 51 (as seen at Fig. 3) with the recess 55 in the intermediate guide plate 28ª, and to the rearward position by the engagement of the same bolt with the recess 54 in the intermediate guide plate 28.

The particular construction of the transmission levers herein shown, described and claimed formed a part of the subject matter of my original application, Serial No. 314,226, filed April 28, 1906, which resulted in patent No. 954,531, dated April 12, 1910, of which this application is a continuation and division.

Having thus described my invention, what I claim and desire to secure by Letters Patent is:

1. The combination with a transmission mechanism embodying a plurality of shifting rods, of means for actuating the same comprising a supporting shaft, a plurality of sleeves revolubly arranged thereon, arms fixed upon said sleeves adapted for connection with said shifting rods, supplemental levers fixed upon said sleeves, guides for said supplemental levers, a support for said guides, locking devices arranged upon said supplemental levers adapted to hold said supplemental levers normally locked to their neutral positions, an oscillating, operating lever pivotally mounted upon said supporting shaft intermediate said supplemental levers, and normally engaging the locking devices of both of said supplemental levers, means arranged upon said operating lever adapted to actuate the locking device of either of said supplemental levers whereby to lock said supplemental lever in operative relation with said operating lever, without disturbing the locking device for maintaining the other of said supplemental levers in its neutral position, and a plurality of locking devices arranged upon said operating lever adapted to lock said operating lever and either one of said supplemental levers engaged thereby to any of their adjusted positions, substantially as specified.

2. The combination with a transmission mechanism embodying a plurality of shifting rods, of means for actuating the same comprising a supporting shaft, a plurality of sleeves revolubly arranged thereon, arms fixed upon said sleeves adapted for connection with said shifting rods, supplemental levers fixed upon said sleeves having slots adjacent to their upper ends, guide plates for said supplemental levers, a support for said guide plates, stops arranged intermediate said guide plates, spring actuated locking devices arranged upon said supplemental levers adapted to engage said guide plates, to hold said supplemental levers locked to their neutral positions, projections upon said locking devices extending through the slots in said supplemental levers, a collar loosely mounted upon one of said sleeves intermediate the supplemental levers, an operating lever having its lower end forked and pivotally secured to said collar, cam projections arranged upon the sides of said operating lever adapted to engage the projections of the locking devices of said supplemental levers, spring actuated locking devices arranged upon said operating lever adapted to engage one of said guide plates to lock the same, and the supplemental lever engaged thereby to their adjusted positions, and a lever and rods connected to said locking devices whereby to release the same, substantially as specified.

3. The combination with a transmission mechanism embodying a plurality of shifting rods, of means for actuating the same, comprising a supporting shaft, a plurality of sleeves revolubly arranged thereon, arms fixed upon said sleeves and connected with said shifting rods, supplemental levers fixed upon the outer ends of said sleeves and provided adjacent to their upper ends with longitudinal slots; means for guiding said supplemental levers, stops for limiting the movement of said supplemental levers, spring-pressed bolts on said supplemental levers for locking the same to their neutral positions, members on said spring-pressed bolts extending through the longitudinal slots in said supplemental levers, an operating lever having its lower end pivotally mounted intermediate the fixed ends of said supplemental levers and adapted to oscillate longitudinally of said sleeves to engage either of said supplemental levers, means arranged upon said operating lever adapted to engage the members mounted upon the spring-pressed bolts on said supplemental levers to unlock either of said supplemental levers, means for locking said operating lever and the supplemental lever engaged thereby to their operative positions, and a release for said last-named locking means, substantially as specified.

Signed at Allentown, Lehigh county, in the State of Pennsylvania, this 31st day of January, Nineteen hundred and ten.

JOHN M. MACK.

Witnesses:
G. HAROLD BECHTEL,
RAYMOND W. LENTZ.

Copies of this patent may be obtained for five cents each, by addressing the "Commissioner of Patents, Washington, D. C."